United States Patent [19]

Rosenthal et al.

[11] Patent Number: 4,662,463

[45] Date of Patent: May 5, 1987

[54] PRESTRESSED SINGLE LOAD CELL WEIGHING SYSTEMS

[75] Inventors: Henry Rosenthal; Howard E. Kronhaus, both of Boca Raton, Fla.

[73] Assignee: Mima, Inc., Pompano Beach, Fla.

[21] Appl. No.: 771,316

[22] Filed: Aug. 30, 1985

[51] Int. Cl.[4] .................. G01G 23/14; G01G 3/14; G01G 21/24

[52] U.S. Cl. .................. 177/164; 177/210 R; 177/255

[58] Field of Search .......... 177/164, 210 R, 211, 177/244, 255, DIG. 9; 73/1 B, 862.65

[56] References Cited

U.S. PATENT DOCUMENTS

| | | | |
|---|---|---|---|
| 2,802,660 | 8/1957 | Williams, Jr. ........................ | 177/255 |
| 3,003,830 | 10/1961 | Blazek et al. .................. | 177/DIG. 9 |
| 3,869,007 | 3/1975 | Haggstrom et al. ............ | 177/255 X |
| 3,924,729 | 12/1975 | Flinth et al. .................. | 177/DIG. 9 |
| 4,248,317 | 2/1981 | Rahav .............................. | 177/255 X |

Primary Examiner—George H. Miller, Jr.
Attorney, Agent, or Firm—Pennie & Edmonds

[57] ABSTRACT

A system for measuring weight of objects using a single load cell means which comprises a pair of structural means having at least four sides and four corners, with pairs of opposed sides being substantially equal in length, a tensioned member positioned at each of said four corners of the structural means and load cell means extending therebetween an generally centrally thereof which is maintained under a predetermined compressive force applied by the structural means.

19 Claims, 4 Drawing Figures

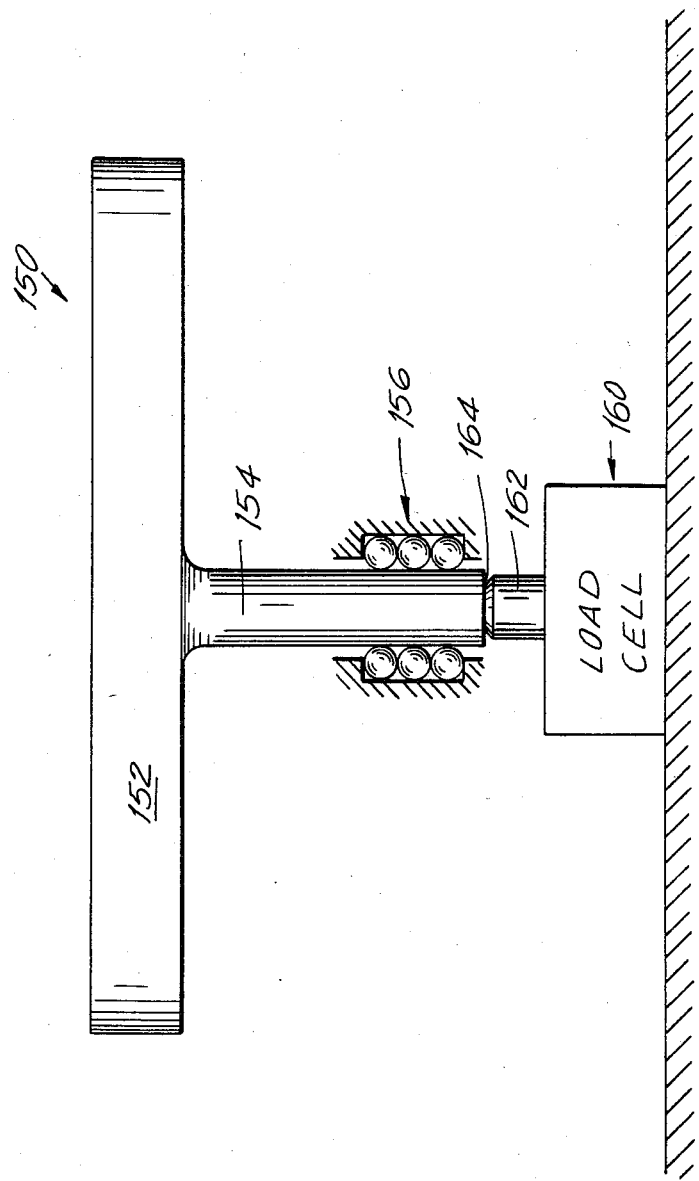

PRESTRESSED SINGLE LOAD CELL WEIGHING SYSTEMS

BACKGROUND OF THE INVENTION

The present invention relates to improvements in systems and methods for load weighing of objects. In particular, the invention relates to a system for weighing objects utilizing single load cell means.

DESCRIPTION OF THE PRIOR ART

Weighing devices, as means for performing weighing operations, are well known in the art. These devices are designed for a maximum load and a specified accuracy to operate within a given temperature range, and they must be rugged enough to withstand the intended service conditions.

Weight is directly related to mass and is the resultant force acting on a mass due to the earth's gravitational field. Weighing is a dynamic operation, and the time required for a scale or balance to reach an equilibrium condition is important. Mechanical and spring balances are often equipped with fluid dashpots or other devices to damp the system, permitting equilibrium to be reached in the minimum time. More elaborate weighing systems have inherently short time constants and therefore reach such equilibrium quickly.

There are a number of different types of weighing devices in the art. In mechanical scales, the load is measured either by comparing it with a known weight such as with even-balance type scales or by directly measuring the distortion of a spring caused by the load.

In beam-type scales, the force exerted by the load is reduced by a lever system and then measured by the position of a known weight (poise) on a graduated beam. The poise is manually adjusted until the beam is in balance. Fixed weights may also be added at the tip of the beam in order to offset definite amounts of load. Both even-balance and beam-type scales derive their sensitivity from the minimal requirement to manually adjust the balance only for the measurement of the final small percentage of the total weight.

Automatic indicating scales eliminate the manual operation of placing weights in one pan of the balance (i.e. for even balance scales) or positioning a poise on a graduated beam (in a beam-type scale). Since it is frequently desired to offset the empty weight of the container for the material to be weighed, most automatic indicating scales are equipped with a tare beam wherein a poise is moved until the empty weight of the container is offset. A known weight is then moved by the rotation of a cam until it counterbalances the force from the load and the amount of such movement is measured and shown by an indicator which is driven by a rack and pinion device.

In spring-type automatic indicating scales, the deflection of a spring is measured and shown by an indicator. The oscillations of this device, as well as those devices discussed above, must be critically dampened, usually by means of a dashpot, i.e. a plunger moving in a cylinder containing oil. In some cases, the load is supported directly from the springs but many other types are connected to levers and may also make use of a tare beam.

Another type of weighing device is known as a load cell. These are small electric, hydraulic or pneumatic units that are often employed where larger beam machines are unsuitable. An electric load cell is cylindrical in shape and only a few inches high. It consists of a load carrying bar to which are attached four matched wire gauges, known as electrical resistance strain gauges, which, in turn, are electrically connected into a direct current Wheatstone bridge circuit. These gauges consist of a small pad of fine resistance wire insulated electrically from its surroundings. As a load is increased or decreased on the assembly to which it is attached, deformation of both the assembly and the strain gauge occurs. This change in dimension alters the electrical resistance characteristics of the strain gauge and the change in resistance can be correlated in terms of the force required to produce the change.

In hydraulic load cells a thin film of oil is contained between a short-stroke piston and a diaphragm. The pressure between the two when subjected to compression from a load gives an indication of the weight. Although the accuracy of these cells is very high and they can handle loads up to about 5,000,000 pounds within 0.1%, these cells are unsuitable for oscillating loads.

Pneumatic cells have a piston and cylinder arrangement in which high-pressure air from an external source is made to balance the unknown load. They are employed for measuring light and medium loads and are more popular for weight control than for measuring weights.

While the mechanical type scales are relatively advantageous for use as weighing devices because they are highly accurate, require no exterior power source and are inexpensive to purchase and maintain, these advantages may be overcome by other factors, i.e. the relatively complicated and expensive installation for weighing large loads, the possibility of damage to the mechanism from corrosive fumes or liquids, and the difficulties encountered in reading the weight and maintaining the balance in areas of excessive vibration, such as those frequently found in manufacturing environments.

The advantages of the various types of load cell scales are that their mechanisms are relatively compact, they are relatively easy to protect from vibration by means of the dampening procedure described above, and they are inexpensive to install.

However, a major disadvantage to the previous methods of making weight determinations by the use of load cells is the need for additional equipment necessary to totalize the load on several load cells, such as for a large platform scale. The electrical equipment which must be added to control this operation is very expensive.

In comparison to the prior art, the applicants have discovered a new method of making weight determinations which utilizes only a single load cell and overcomes the disadvantages of multiple load cell weighing systems as outlined above.

SUMMARY OF THE INVENTION

The invention relates to a system for measuring weight of objects or the like using a single load cell means which comprises a pair of structural means positioned in generally parallel face-to-face spaced relation. At least one of the structural means has an upper surface for supporting objects or the like to be weighed, and load cell means extending generally perpendicular to the upper support surface.

The system includes means for connecting at least one end portion of the load cell means to the at least one structural means such that forces applied to that structural means by objects or the like positioned to be weighed at selected locations on its upper support surface will be transmitted to the load cell means without varying the angular orientation between the structural means and the load cell means. The invention also comprises means for transmitting the applied forces to the at least one structural means to the other structural means. This arrangement provides lower restraint for the forces thus transmitted such that the load cell means provides signals representative of such forces.

The means for connecting at least one end portion of the load cell means to the structural means comprises a substantially rigid structural connector which maintains the predetermined generally perpendicular relation between the upper surface of the structural member and the load cell means. Preferably, this substantially rigid structural connector comprises at least one bearing means positioned in engagement with the body of the load cell means for preventing angular variations between the upper surface of the structure member and the load cell means. Advantageously, the bearing means is a roller support bearing positioned about the body of the load cell means.

The invention also contemplates a system for measuring weight of objects or the like using a single load cell means which comprises a pair of structural means positioned in face-to-face opposed relation and having load cell means extending therebetween and generally centrally thereof, with the load cell means being maintained under predetermined compressive forces applied by each of the structural means. Also, a tensioned member equidistantly positioned at each of at least three locations of the structural means is provided. Each member is maintained in tension an equal amount (i.e, approximately equal to one-third of the compressive force on the load cell means when three members are used), such that the structural means are respectively maintained in a stabilized equilibrium condition whereby exerting a force externally to at least one of the structural means produces a signal by the load cell means reflective of the external force applied thereby providing means for measuring the amount of the force with the single load cell means.

In this embodiment each of the structural means is in the form of a generally circular configured frame or plate member, the tensioned members are spaced apart at 120° intervals, and the end portion of each of the tensioned members is connected with the adjacent frame or plate members. In addition, conveyor means can be positioned and supported on the pair of opposed structural means such that when an article or the like is positioned and conveyed on the conveyor means, the weight of the article is reflected directly by the signal produced by the load cell means.

The invention also relates to a system for measuring weight of objects or the like using single load cell means which comprises a pair of structural means having at least four sides and four corners, with pairs of opposed sides being substantially equal in length, the pair of structural means being positioned in face-to-face opposed relation and having load cell means extending therebetween and generally centrally thereof. The load cell means is maintained under predetermined compressive forces applied by each of the structural means and a tensioned member positioned at each of the four corners of the structural means. Each of the tensioned members are maintained in tension an amount approximately equal to one-fourth of the compressive force on the load cell means such that the structural means are respectively maintained in a stabilized equilibrium condition whereby exerting a force externally to at least one of the structural means produces a signal by the load cell means reflective of the external force applied thereby providing means for measuring the amount of the force with the single load cell means.

The weight measurement system of the invention can also include electrical circuitry communicating and connected to the load cell means to thereby process the signal from the load cell means to measure the signal, with means being provided to determine and indicate the precise external force applied to the structural means. Preferably, each of the structural means is in the form of a generally rectangular frame or plate member having opposed sides approximately equal in length and at least four corner portions with means being provided to connect each of the tensioned members between correspondingly opposed corner portions of each of the frame member or plate member.

The weight measurement system of the invention also includes conveyor means positioned and supported on the pair of opposed structural means such that when an article or the like is positioned and conveyed on the conveyor means, the weight of the article is reflected directly by the signal produced by the load cell means.

In this system, the opposed structural means are comprised of a either a pair of frame members configured in the form of a rectangular configuration or a pair of plate members having a generally rectangular configuration. Also, the frame or plate members each have a square configuration.

The invention also relates to a system for measuring weight of objects during transport on conveyor means by using single load cell means which comprises positioning and supporting a portion of the conveyor means on structural means. The structural means comprise a pair of frame or plate members positioned in generally parallel face-to-face opposed relation, load cell means attached to and extending between the pair of frame or plate members, and a tensioned member positioned at each of the corners of the pair of frame or plate members, each tensioned member being maintained in tension so as to cause a predetermined compressive force on the load cell means equal to about four times the force on each tension member such that the pair of frame or plate members are respectively maintained in a stabilized equilibrium condition.

To measure the weight of these objects, the objects are transported over the portion of the conveyor means which is positioned and supported by the structural means so as to exert a downward force on at least one of the frame or plate members to produce a signal by the load cell means reflective of the external force applied, thereby providing means for measuring the amount of the external force with the single load cell means.

In a preferred arrangement, the pair of frame or plate members are configured in a rectangular or square configuration. Also each pair of frame or plate members further comprises at least one frame member extending from diagonally opposite corners of the frame members. Advantageously, the load cell means extends between the diagonal frame members or the plate members in a generally central location.

The system also includes electrical circuitry communicating and connected to the load cell means to thereby process the signal from the load cell means to measure the signal, with means being provided to determine and indicate the precise downward force applied to the frame or plate members.

BRIEF DESCRIPTION OF THE DRAWINGS

Preferred embodiments of the invention are described hereinbelow with reference to the drawing figures wherein:

FIG. 4 is a front view of a weighing table according to the invention.

DETAILED DESCRIPTION OF THE PREFERRED EMBODIMENTS

Figure 1:
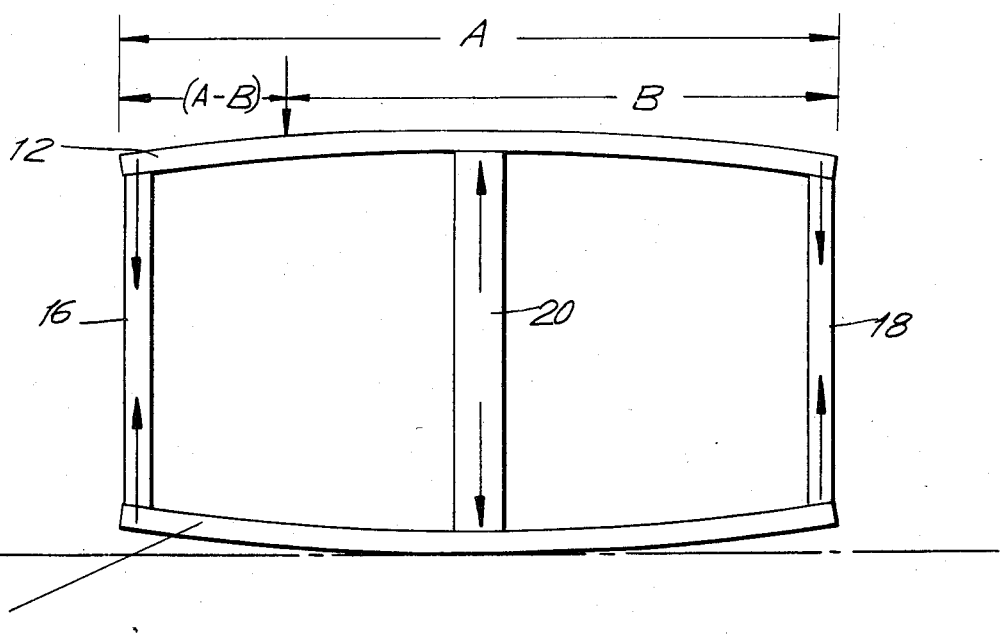
FIG. 1 is a schematic view of the invention illustrating the weighing principle upon which it is based.

Referring initially to FIG. 1, there is illustrated a schematic view of a single load cell weighing apparatus constructed in accordance with the invention. The upper frame member 12 and lower frame member 14 are connected at each end by tension members 16 and 18. Load cell 20 is centrally positioned and maintained in compression. Tension members 16 and 18 are maintained in tension by loading the central load cell 20 with a predetermined compressive force. Frame members 12 and 14 are shown as having curved configurations for illustrative purposes only to show force directions. In actuality, these members may appear to be either straight or slightly curved.

Referring once again to FIG. 1, any load "X" placed on the top of frame member 12 transmits a downward force in the position in which it sits. This force multiplied by the distance from the center of the frame will then transmit a bending moment to the frame member 12. As can be seen from FIG. 1, the respective loads on the frame members 16 and 18 also exert a bending moment on the individual members, but these bending moments will be cancelled since the members are equidistant from the center of the plate and on opposite sides. Then, the moment force can be converted to a load weight which can be read directly from the single load cell.

Figure 2:
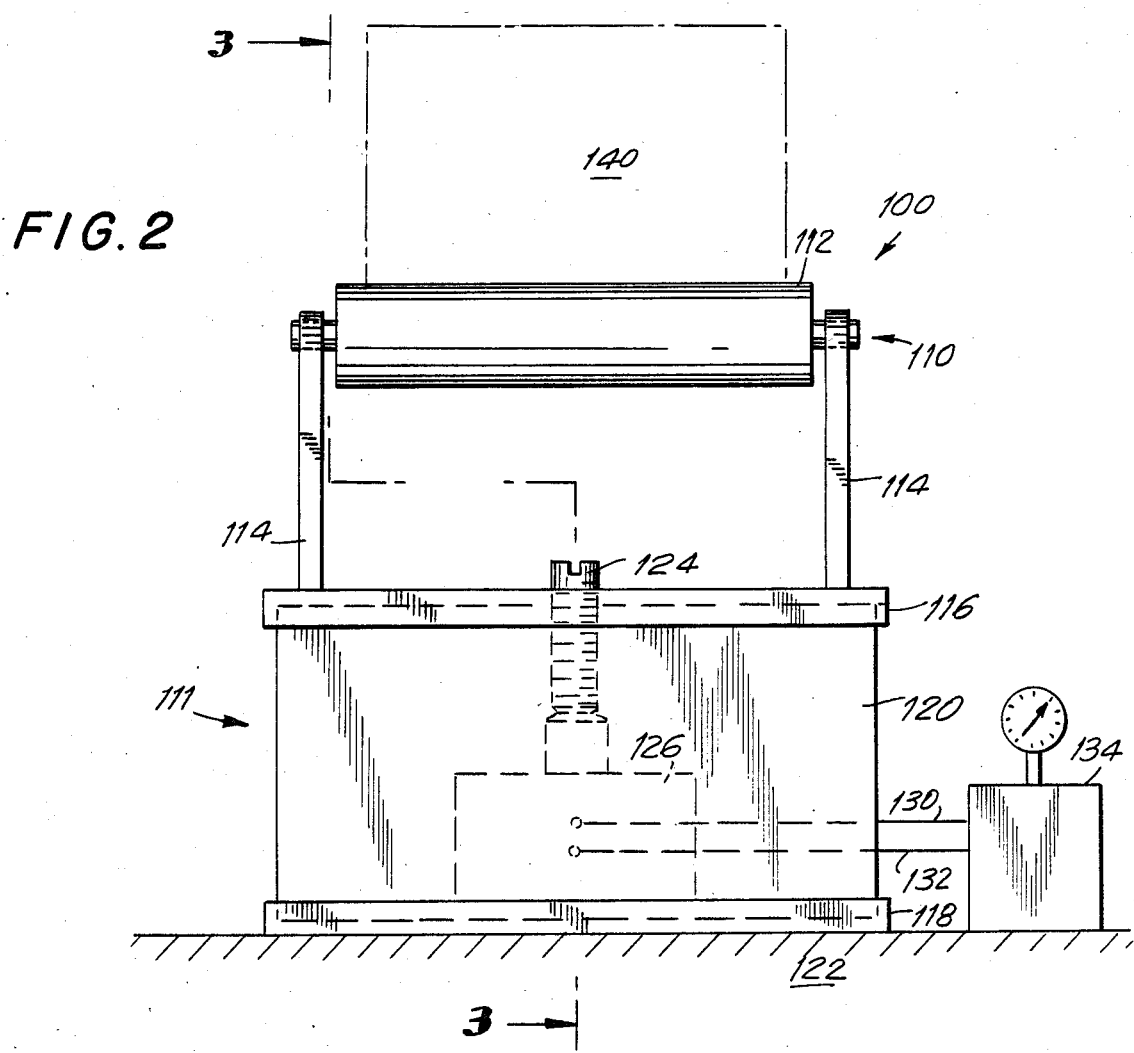
FIG. 2 is a front view of a roller conveyor and load cell arrangement according to the invention.

FIG. 2 illustrates an embodiment of the single load cell of the invention when used in conjuction with a roller conveyor assembly. In this view, the assembly 100 consists of roller conveyor 110 having of a plurality of rollers 112, rotatably mounted on conveyor frame 114. Conveyor frame 114 is then placed upon an upper plate member 116 connected to lower plate member 118 by side panels 120. Plate 118 is mounted on the floor or other supporting structure shown at 122. Loading screw 124 is used to place the load cell 126 in compression while correspondingly placing outer legs 120 in tension. The load cell 126 is connected by a plurality of suitable wires 130, 132 (or as needed) to meter 134 which converts the load cell signal into a direct reading of the weight of the load 140.

Figure 3:
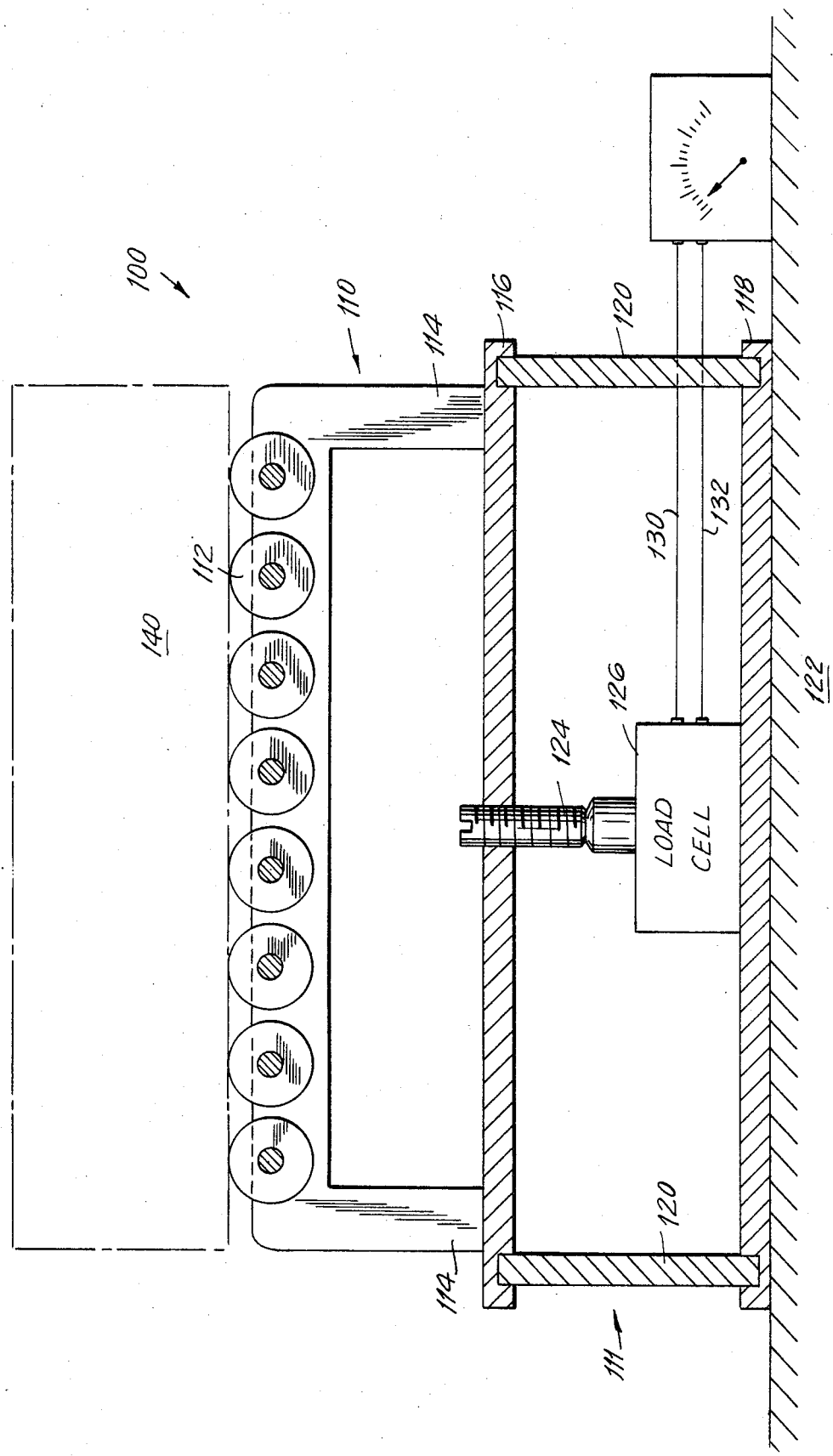
FIG. 3 is a cross-sectional side view of the roller conveyor and load cell of FIG. 2 taken across lines 3—3 of FIG. 2.

As is evident in FIGS. 2 and 3, when load 140 is placed upon roller conveyor 110, the weight of the load is transferred to the plate structure 111. Then since as mentioned above the moment arms from legs 120 cancel each other, the weight of the load 140 is converted to a moment force and is measured directly by the single load cell 126. This moment force is then converted to a direct measurement of the weight of the load in meter 134.

Referring now to FIG. 4, there is illustrated an alternate embodiment of the invention relating to a weighing table 150. Table 150 includes planar upper surface 152 and rigid column 154 capable of supporting and maintaining table 150 in a horizontal position when loads are placed thereupon.

Anti-friction bearings 156, as shown, prevent lateral movement of column 154 when loads are placed on the table 150. In this manner, the force of any loads placed on table 150 is transmitted directly to the load cell 160. To assist in transmitting the force to the load cell 160, a lower columnar member 162 having a convex upper surface 164 is utilized.

As described previously, the load cell is calibrated so that the weight of table 150, column member 154, and lower columnar member 162 are initially subtracted as "tare" so that, before placement of loads, the weight reading is zero.

One advantage of such system is that a plurality of load cells is not necessary, and that the temperature effects on the measurement on the load is cancelled out by the symmetry of the arrangement. Also, the present system is less expensive to operate and is easier to use since the weight is measured directly and read electronically without the need to utilize sophisticated equipment to intergrate readings from a plurality of load cells into a single value. The system also has advantages from a mechanical design standpoint.

Although the preferred embodiment is shown utilizing the single load cell arrangement with a conveyor assembly can be appreciated that the novelty of the invention can be utilized for weighing any type of object whether in a continuous mode such as shown or by separately placing objects on top of the upper plate of the single load cell assembly.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

We claim:

1. A system for measuring weight of objects or the like using a single load cell means which comprises:
   a. a pair of structural means positioned in face-to-face opposed relation and having load cell means extending therebetween and generally centrally thereof, said load cell means being maintained under predetermined compressive forces applied by each of said structural means; and
   b. a tensioned member equidistantly positioned at each of at least three locations of said structural means, each member being maintained in tension an amount approximately equal to one-third of the compressive force on said load cell means such that said structural means are respectively maintained in a stabilized equilibrium condition whereby exerting a force externally to at least one of said structural means produces a signal by said load cell means reflective of said external force applied thereby providing means for measuring the amount of said force with said single load cell means.

2. The system according to claim 1 wherein each of said structural means is in the form of a generally circular configured frame or plate member, said at least three tensioned members are spaced apart at 120° intervals, and the end portion of each of said at least three tensioned members is connected with the adjacent frame or plate members.

3. The system according to claim 2 further comprising conveyor means positioned and supported on said pair of opposed structural means such that when an article or the like is positioned and conveyed on said conveyor means, the weight of the article is reflected directly by the signal produced by said load cell means.

4. A system for measuring weight of objects or the like using a single load cell means which comprises:
   a. a pair of structural means having at least four sides and four corners, with pairs of opposed sides being substantially equal in length, said pair of structural means being positioned in face-to-face opposed relation and having load cell means extending therebetween and generally centrally thereof, said load cell means being maintained under predetermined compressive forces applied by each of said structural means; and
   b. a tensioned member positioned at each of said four corners of said structural means, each member being maintained in tension an amount approximately equal to one-fourth of the compressive force on said load cell means such that said structural means are respectively maintained in a stabilized equilibrium condition whereby exerting a force externally to at least one of said structural means produces a signal by said load cell means reflective of said external force applied thereby providing means for measuring the amount of said force with said single load cell means.

5. The system according to claim 4 further comprising electrical circuitry communicating and connected to said load cell means to thereby process the signal from said load cell means to measure said signal, with means being provided to determine and indicate the precise external force applied to said structural means.

6. The system according to claim 5 wherein each of said structural means is in the form of a generally rectangular frame member or plate member having opposed sides approximately equal in length and at least four corner portions with means being provided to connect each of said tensioned members between correspondingly opposed corner portions of each of said frame member or plate member.

7. The system according to claim 4 further comprising conveyor means positioned and supported on said pair of opposed structural means such that when an article or the like is positioned and conveyed on said conveyor means, the weight of the article is reflected directly by the signal produced by said load cell means.

8. The system according to claim 7 wherein said opposed structural means are comprised of either a pair of frame members configured in the form of a rectangular configuration or plate members having a generally rectangular configuration.

9. The system according to claim 8 wherein said frame members or plate members each have a square configuration.

10. A system for measuring weight of objects during transport on conveyor means by using a single load cell means which comprises:
    (a) positioning and supporting a portion of said conveyor means on structural means, said structural means comprising:
        (i) a pair of frame members positioned in generally parallel face-to-face opposed relation;
        (ii) load cell means attached to and extending between said pair of frame members; and
        (iii) a tensioned member positioned at each of the corners of said pair of frame members, each member being maintained in tension so as to cause a predetermined compressive force on said load cell equal to about four times the tensioned force on each tensioned member such that said pair of frame members are respectively maintained in a stabilized equilibrium condition; and
    (b) transporting said objects over said portion of said conveyor means which is positioned and supported by said structural means so as to exert a downard force on at least one of said frame members produce a signal by said load cell means reflective of said external force applied thereby providing means for measuring the amount of said external force with said single load cell means.

11. The system according to claim 10 wherein said pair of frame members are configured in a rectangular or square configuration.

12. The system according to claim 10 wherein said pair of frame members each further comprises at least one frame member extending from diagonally opposite corners of said frame members.

13. The system according to claim 12 wherein said load cell means extends between said diagonal frame members in a generally central location.

14. The system according to claim 10 further comprising electrical circuitry communicating and connected to said load cell means to thereby process the signal from said load cell means to measure said signal, with means being provided to determine and indicate the precise force applied to said frame members.

15. A system for measuring weight of objects during transport on conveyor means by using a single load cell means which comprises:
    (a) positioning and supporting a portion of said conveyor means on structural means, said structural means comprising:
        (i) a pair of plate members positioned in generally parallel face-to-face opposed relation;
        (ii) load cell means attached to and extending between said pair of plate members; and
        (iii) a tensioned member positioned at each of the corners of said pair of plate members, each member being maintained in tension so as to cause a predetermined compressive force on said load cell means equal to about four times the tensioned force on each tensioned member such that said pair of plate members are respectively maintained in a stabilized equilibrium condition;
    (b) transporting said objects over said portion of said conveyor means which is positioned and supported by said structural means so as to exert a downward force on at least one of said plate members to produce a signal by said load cell means reflective of said external force applied thereby providing means for measuring the amount of said external force with said single load cell means.

16. The system according to claim 15 wherein said pair of plate members are configured in a rectangular or square configuration.

17. The system according to claim 15 wherein said load cell means extends between said plate members in a generally central location.

18. The system according to claim 15 further comprising electrical circuitry communicating and connected to said load cell means to thereby process the signal from said load cell means to measure said signal, with means being provided to determine and indicate the precise external force applied to said plate members.

19. A system for measuring weight of objects or the like using single load cell means which comprises:

a. a pair of structural means positioned in face-to-face opposed relation and having load cell means extending therebetween and generally centrally therof, said load cell means being maintained under predetermined compressive forces applied by each of said structural means; and b. a tensioned member equidistantly positioned at each of at least three locations of said structural means, each member being maintained in an approximately equal amount of tension from the compressive force on said load cell means such that said structural means are respectively maintained in a stabilized equilibrium condition whereby exerting a force externally to at least one of said structural means produces a signal by said load cell means reflective of said external force applied thereby providing means for measuring the amount of said force with said single load cell means.

* * * * *